US012175167B2

(12) United States Patent
Gupta et al.

(10) Patent No.: US 12,175,167 B2
(45) Date of Patent: Dec. 24, 2024

(54) METHOD AND SYSTEM FOR DESIGN AND ENGINEERING LED FIBER ROLLOUT

(71) Applicant: Tata Consultancy Services Limited, Mumbai (IN)

(72) Inventors: Ashwani Gupta, Gurgaon (IN); Vimal Kumar, Gurgaon (IN); Rajesh Aggarwal, Gurgaon (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 875 days.

(21) Appl. No.: 17/196,436

(22) Filed: Mar. 9, 2021

(65) Prior Publication Data
US 2021/0374305 A1 Dec. 2, 2021

(30) Foreign Application Priority Data

May 26, 2020 (IN) .............................. 202021022044

(51) Int. Cl.
*G06F 30/18* (2020.01)
*G06F 30/17* (2020.01)
(Continued)

(52) U.S. Cl.
CPC .............. *G06F 30/18* (2020.01); *G06F 30/17* (2020.01); *G06F 30/20* (2020.01);
(Continued)

(58) Field of Classification Search
CPC .. G06F 2111/12; G06F 30/00; G06F 2111/02; G06F 2113/16; G06F 30/18;
(Continued)

(56) References Cited

U.S. PATENT DOCUMENTS

2012/0065944 A1* 3/2012 Nielsen ................. G06Q 50/06
703/1
2016/0328264 A1* 11/2016 Sparapani ................ G06F 8/65
(Continued)

FOREIGN PATENT DOCUMENTS

DE 102018103656 A1 8/2019

OTHER PUBLICATIONS

Bonoraat, et al., Planning an FTTH Network and Estimate its Capacity Evolution in the Long Term, PhD diss., Politecnico di Torino (2019) (Year: 2019).*

(Continued)

*Primary Examiner* — Charles Guiliano
(74) *Attorney, Agent, or Firm* — Finnegan, Henderson, Farabow, Garrett & Dunner, LLP

(57) ABSTRACT

Optical fiber network or fiber network is used for transmitting large volumes of data with maximum speed. Fiber to home is a recent technology of the fiber network where the initial fiber rollout cost is more. Hence a proper network management is necessary to rollout the fiber network in an optimized manner. Conventional methods provides construction led approach for fiber network planning and field survey. The present disclosure receives a plurality of geocoded addresses associated with a plurality of users and an average revenue per user. A fiber rollout cost projection is performed based on the input data and a fiber network is generated based on the projected fiber rollout cost. Further, field survey is performed based on the generated network and a fiber network construction design is made. Further, a fiber network rollout is performed based on the fiber network construction design and a redline deviation markup.

7 Claims, 7 Drawing Sheets

(51) Int. Cl.
*G06F 30/20* (2020.01)
*G06Q 10/0631* (2023.01)
*G06Q 10/0875* (2023.01)
*G06Q 30/0201* (2023.01)
*G06F 113/16* (2020.01)

(52) U.S. Cl.
CPC ..... *G06Q 10/0631* (2013.01); *G06Q 10/0875* (2013.01); *G06Q 30/0206* (2013.01); *G06F 2113/16* (2020.01)

(58) Field of Classification Search
CPC .......... G06F 30/20; G06F 16/56; G06F 30/17; G06F 8/60; G06F 8/65; G06F 9/4881; G06F 9/4887; G06F 30/398; G06F 16/27; G06F 30/22; G06F 9/485; G06F 16/29; G06Q 10/067; G06Q 10/10; G06Q 30/0621; G06Q 30/0635; G06Q 10/0631; G06Q 10/063116; G06Q 10/06312; G06Q 10/06316; G06Q 10/0633; G06Q 10/0875; G06Q 30/0206; G06Q 10/047; G06Q 10/0635; G06V 20/176; G06V 20/182
USPC ....................................................... 705/7.11
See application file for complete search history.

(56) References Cited

U.S. PATENT DOCUMENTS

2018/0276241 A1   9/2018  Hebbaluguppe et al.
2020/0162336 A1*  5/2020  Gonguet ............. H04L 41/0893

OTHER PUBLICATIONS

Skaljo, et al., A Cost Effective Topology in Fiber to the Home Point to Point Networks Based on Single Wavelength Bi-Directional Multiplex, 2015 International Workshop on Fiber Optics in Access Network (FOAN), pp. 11-16. IEEE (2015) (Year: 2015).*
Szczesniak, Ireneusz et al., "Generic Dijkstra for Optical Networks", Networking and Internet Architecture, Oct. 2018, Arxiv, https://arxiv.org/pdf/1810.04481.pdf.
Dalela, Pankaj Kumar et al., "Modification of Existing Routing Algorithms for Geo-Intelligence Based OFC Network Route Planning", International Journal of Advances in Electronics and Computer Science, Oct. 2016, vol. 3, Issue 10 pp. 2393-2835, IRAJ, http://www.iraj.in/journal/journal_file/journal_pdf/12-306-147893485823-26.pdf.

* cited by examiner

METHOD AND SYSTEM FOR DESIGN AND ENGINEERING LED FIBER ROLLOUT

PRIORITY CLAIM

This U.S. patent application claims priority under 35 U.S.C. § 119 to: India Application No. 202021022044, filed on May 26, 2020. The entire contents of the aforementioned application are incorporated herein by reference.

TECHNICAL FIELD

The disclosure herein generally relates to the field of network management and, more particular, to a method and system for design and engineering led fiber rollout.

BACKGROUND

Optical fiber network or fiber network is used for transmitting large volumes of data with maximum speed. Fiber to home is a recent technology of the fiber network, where each home is connected directly using fiber network. Even though maintenance cost of fiber network is less, initial rollout cost is more. Hence a proper network management is necessary to rollout the fiber network in an optimized manner.

Conventional methods provides construction led approach for fiber network planning and field survey. The fiber network planning is performed using conventional graph theory methods in conventional methods and hence finding an optimized network planning is challenging. Further, if there is any deviation in a planned design, the conventional methods fails to update the deviation in design dynamically. Hence an end to end integrated and dynamic design led fiber rollout management is challenging.

SUMMARY

Embodiments of the present disclosure present technological improvements as solutions to one or more of the above-mentioned technical problems recognized by the inventors in conventional systems. For example, in one embodiment, a method for design and engineering led fiber rollout is provided. The method includes receiving a plurality of geocoded addresses associated with a plurality of users of a user segment to be connected by a fiber network and an Average Revenue Per User (ARPU), wherein the plurality of geocoded addresses, including corresponding latitude and longitude coordinates, are computed based on a plurality of survey images, and wherein the user segment is divided into a plurality of fields including: a green field representing construction of new infrastructure and associated fiber infrastructure, wherein the green field is associated with a green field data including characteristics of, existing assets, existing roads, existing heritage and existing railway lines; a brown field representing one or more existing infrastructure and needs alteration in existing fiber infrastructure, wherein the brown field is associated with a brown field data including characteristics of existing ducts, existing routes, existing cables, existing equipment, existing manholes and the green field data; and an overbuild field representing additional fiber infrastructure, wherein the overbuild is associated with an overbuild field data including characteristics of existing ducts, existing routes, existing equipment, existing cables, existing manholes, amount of used fiber and amount of unused fiber. Furthermore, method includes computing a fiber rollout cost projection associated with the user segment based on the ARPU, the green field data, the brown field data and the overbuild data, wherein computing the fiber rollout cost projection includes: (i) computing a plurality of paths in each of the plurality of fields using a Distributed Fiber Network (DFN) algorithm (ii) performing computation of a) an existing duct capacity for each of the plurality of paths corresponding to the brown field and the overbuild field and computation of a number of new brown field ducts needed, if the existing duct capacity associated with the brown field and overbuild field exceeds a predetermined duct threshold (iii) computing a number of new green field ducts needed for each of the plurality of paths corresponding to the green field (iv) computing a shortest path from the plurality of paths corresponding to each of the plurality of fields based on a total length of the path (v) performing selection of a fiber technology suitable for the shortest path corresponding to each of the plurality of fields and validating corresponding inventory based on the selected fiber technology and (vi) computing the fiber rollout cost projection for each of the shortest path corresponding to the plurality of fields based on the ARPU associated with each of the plurality of users of the shortest path, the total length of the corresponding shortest path and the selected fiber technology. Furthermore, method includes generating a fiber network using the DFN algorithm based on the shortest paths corresponding to the plurality of fields and the fiber rollout cost projection associated with the shortest paths, wherein the fiber network connects maximum number of users with minimum fiber rollout cost. Furthermore, method includes generating a field survey report based on the generated fiber network and a plurality of survey parameters, wherein the field survey report includes duct validation report, new infrastructure identification, survey photographs, equipment location finalization. Furthermore, method includes computing a fiber network construction design by updating the fiber network based on the field survey report by utilizing a design tool, wherein the design tool is AutoCAD (Computer Aided Design). Furthermore, method includes performing a fiber network rollout based on the fiber network construction design and a plurality of network rollout parameters, wherein the fiber network rollout includes program governance, redline deviation markup, inventory monitoring and digital reporting. Finally method includes updating the fiber network rollout based on redline deviation markup, a construction plan associated with the user segment, and the inventory In another aspect, a system for design and engineering led fiber rollout is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a plurality of geocoded addresses associated with a plurality of users of a user segment to be connected by a fiber network and an Average Revenue Per User (ARPU), wherein the plurality of geocoded addresses, including corresponding latitude and longitude coordinates, are computed based on a plurality of survey images, and wherein the user segment is divided into a plurality of fields including: a green field representing construction of new infrastructure and associated fiber infrastructure, wherein the green field is associated with a green field data including characteristics of, existing assets, existing roads, existing heritage and existing railway lines; a brown field representing one or more existing infrastructure and needs alteration in existing fiber infrastructure, wherein the brown field is associated with a brown field data including characteristics of existing ducts, existing routes, existing cables, existing equipment, existing manholes and the green field data; and an overbuild field representing additional fiber infrastructure, wherein the overbuild is associated with an overbuild field data including characteristics of existing ducts, existing routes, existing equipment, existing cables, existing manholes, amount of used fiber and amount of unused fiber. Further, the one or more hardware processors are configured by the programmed instructions to compute a fiber rollout cost projection associated with the user segment based on the ARPU, the green field data, the brown field data and the overbuild data, wherein computing the fiber rollout cost projection includes: (i) computing a plurality of paths in each of the plurality of fields using a Distributed Fiber Network (DFN) algorithm (ii) performing computation of a) an existing duct capacity for each of the plurality of paths corresponding to the brown field and the overbuild field and computation of a number of new brown field ducts needed, if the existing duct capacity associated with the brown field and overbuild field exceeds a predetermined duct threshold (iii) computing a number of new green field ducts needed for each of the plurality of paths corresponding to the green field (iv) computing a shortest path from the plurality of paths corresponding to each of the plurality of fields based on a total length of the path (v) performing selection of a fiber technology suitable for the shortest path corresponding to each of the plurality of fields and validating corresponding inventory based on the selected fiber technology and (vi) computing the fiber rollout cost projection for each of the shortest path corresponding to the plurality of fields based on the ARPU associated with each of the plurality of users of the shortest path, the total length of the corresponding shortest path and the selected fiber technology. Further, the one or more hardware processors are configured by the programmed instructions to generate a fiber network using the DFN algorithm based on the shortest paths corresponding to the plurality of fields and the fiber rollout cost projection associated with the shortest paths, wherein the fiber network connects maximum number of users with minimum fiber rollout cost. Further, the one or more hardware processors are configured by the programmed instructions to generate a field survey report based on the generated fiber network and a plurality of survey parameters, wherein the field survey report includes duct validation report, new infrastructure identification, survey photographs, equipment location finalization. Further, the one or more hardware processors are configured by the programmed instructions to compute a fiber network construction design by updating the fiber network based on the field survey report by utilizing a design tool, wherein the design tool is AutoCAD (Computer Aided Design). Further, the one or more hardware processors are configured by the programmed instructions to perform a fiber network rollout based on the fiber network construction design and a plurality of network rollout parameters, wherein the fiber network rollout includes program governance, redline deviation markup, inventory monitoring and digital reporting. Finally, the one or more hardware processors are configured by the programmed instructions to update the fiber network rollout based on redline deviation markup, a construction plan associated with the user segment, and the inventory.

In yet another aspect, a computer program product including a non-transitory computer-readable medium having embodied therein a computer program for method and system for design and engineering led fiber rollout is provided. The computer readable program, when executed on a computing device, causes the computing device to receive a plurality of geocoded addresses associated with a plurality of users of a user segment to be connected by a fiber network and an Average Revenue Per User (ARPU), wherein the plurality of geocoded addresses, including corresponding latitude and longitude coordinates, are computed based on a plurality of survey images, and wherein the user segment is divided into a plurality of fields including: a green field representing construction of new infrastructure and associated fiber infrastructure, wherein the green field is associated with a green field data including characteristics of, existing assets, existing roads, existing heritage and existing railway lines; a brown field representing one or more existing infrastructure and needs alteration in existing fiber infrastructure, wherein the brown field is associated with a brown field data including characteristics of existing ducts, existing routes, existing cables, existing equipment, existing manholes and the green field data; and an overbuild field representing additional fiber infrastructure, wherein the overbuild is associated with an overbuild field data including characteristics of existing ducts, existing routes, existing equipment, existing cables, existing manholes, amount of used fiber and amount of unused fiber. Further, the computer readable program, when executed on a computing device, causes the computing device to compute a fiber rollout cost projection associated with the user segment based on the ARPU, the green field data, the brown field data and the overbuild data, wherein computing the fiber rollout cost projection includes: (i) computing a plurality of paths in each of the plurality of fields using a Distributed Fiber Network (DFN) algorithm (ii) performing computation of a) an existing duct capacity for each of the plurality of paths corresponding to the brown field and the overbuild field and computation of a number of new brown field ducts needed, if the existing duct capacity associated with the brown field and overbuild field exceeds a predetermined duct threshold (iii) computing a number of new green field ducts needed for each of the plurality of paths corresponding to the green field (iv) computing a shortest path from the plurality of paths corresponding to each of the plurality of fields based on a total length of the path (v) performing selection of a fiber technology suitable for the shortest path corresponding to each of the plurality of fields and validating corresponding inventory based on the selected fiber technology and (vi) computing the fiber rollout cost projection for each of the shortest path corresponding to the plurality of fields based on the ARPU associated with each of the plurality of users of the shortest path, the total length of the corresponding shortest path and the selected fiber technology. Further, Furthermore, the computer readable program, when executed on a computing device, causes the computing device to generate a fiber network using the DFN algorithm based on the shortest paths corresponding to the plurality of fields and the fiber rollout cost projection associated with the shortest paths, wherein the fiber network connects maximum number of users with minimum fiber rollout cost. Furthermore, the computer readable program, when executed on a computing device, causes the computing device to generate a field survey report based on the generated fiber network and a plurality of survey parameters, wherein the field survey report includes duct validation report, new infrastructure identification, survey photographs, equipment location finalization. Furthermore, Furthermore, the computer readable program, when executed on a computing device, causes the computing device to compute a fiber network construction design by updating the fiber network based on the field survey report by utilizing a design tool, wherein the design tool is AutoCAD (Computer Aided Design). Furthermore, the computer readable program, when executed on a computing device, causes the computing device to perform a fiber network rollout based on the fiber network construction design and a plurality of network rollout parameters, wherein the fiber network rollout includes program governance, redline deviation markup, inventory monitoring and digital reporting. Finally, the computer readable program, when executed on a computing device, causes the computing device to update the fiber network rollout based on redline deviation markup, a construction plan associated with the user segment, and the inventory.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
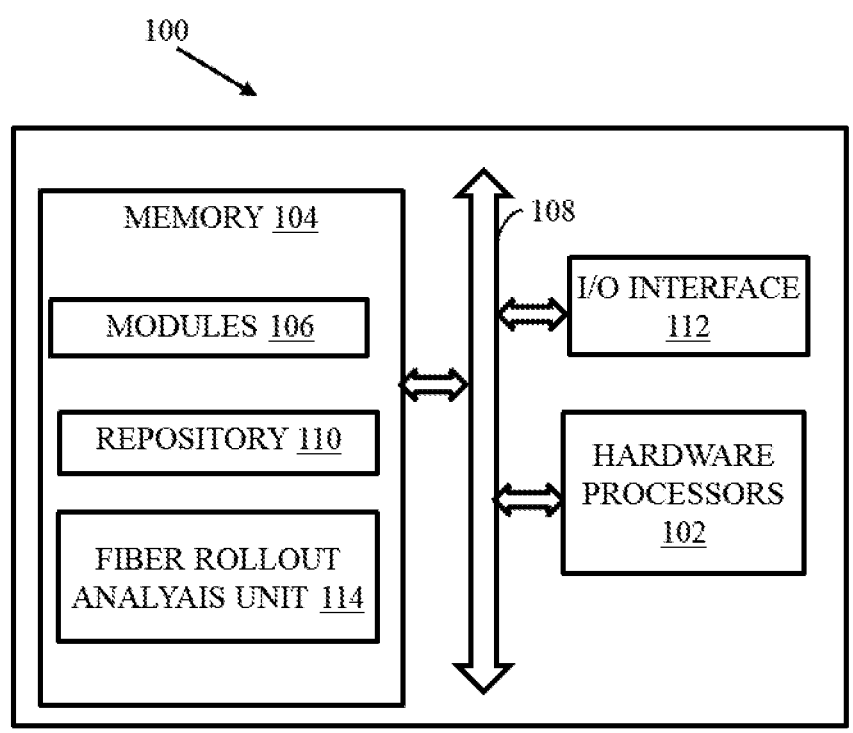
FIG. 1 is a functional block diagram of a system for design and engineering led fiber rollout, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Embodiments herein provide a method and system for design and engineering led fiber rollout to perform digitized fiber rollout in a speedy and accurate manner. The system for design and engineering led fiber rollout provides an end to end dynamic fiber rollout management. Here, the system receives a plurality of geocoded addresses associated with a plurality of users of a user segment to be connected by a fiber network and an Average Revenue Per User (ARPU). Here, the user segment is divided into a plurality of fields including a green field, a brown field and an overbuild field. Once the user segments are divided, a fiber rollout cost projection is computed based on the input data for each fields and a fiber network is generated based on the projected fiber rollout cost. A field survey is performed based on the generated network and a fiber network construction design is made. Once the fiber network construction design is performed, a fiber network rollout is performed based on the fiber network construction design and a redline deviation markup. The redline deviation markup provides deviation in design if any. Further the system and an inventory associated with the system is updated based on the current fiber rollout.

Referring now to the drawings, and more particularly to FIG. 1A through 5, where similar reference characters denote corresponding features consistently throughout the figures, there are shown preferred embodiments and these embodiments are described in the context of the following exemplary system and/or method.

FIG. 1 is a functional block diagram of a system 100 for design and engineering led fiber rollout, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the interface 112 may enable the system 100 to communicate with other devices, such as web servers and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting a number of computing systems with one another or to another server computer. The I/O interface 112 may include one or more ports for connecting a number of devices to one another or to another server. For example, the I/O interface enables receiving the plurality of geocoded addresses associated with the plurality of users of the user segment to be connected by the fiber network, The one or more hardware processors 102 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106 and a fiber rollout analysis unit 114. The memory 104 also includes a data repository 110 for storing data processed, received, and generated by the plurality of modules 106 and the fiber rollout analysis unit 114.

The plurality of modules 106 include programs or coded instructions that supplement applications or functions performed by the system 100 for design and engineering led fiber rollout. The plurality of modules 106, amongst other things, can include routines, programs, objects, components, and data structures, which performs particular tasks or implement particular abstract data types. The plurality of modules 106 may also be used as, signal processor(s), state machine(s), logic circuitries, and/or any other device or component that manipulates signals based on operational instructions. Further, the plurality of modules 106 can be used by hardware, by computer-readable instructions executed by a processing unit, or by a combination thereof. The plurality of modules 106 can include various sub-modules (not shown). The plurality of modules 106 may include computer-readable instructions that supplement applications or functions performed by the system 100 for design and engineering led fiber rollout.

The data repository 110 may include a plurality of abstracted piece of code for refinement and data that is processed, received, or generated as a result of the execution of the plurality of modules in the module(s) 106 and the modules associated with the fiber rollout analysis unit 114. The data repository may also include survey data, geocoded addresses of the plurality of users associated with the user segment and the field data associated with the user segment.

Although the data repository 110 is shown internal to the system 100, it will be noted that, in alternate embodiments, the data repository 110 can also be implemented external to the system 100, where the data repository 110 may be stored within a database (not shown in FIG. 1) communicatively coupled to the system 100. The data contained within such external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS).

Figure 2A:
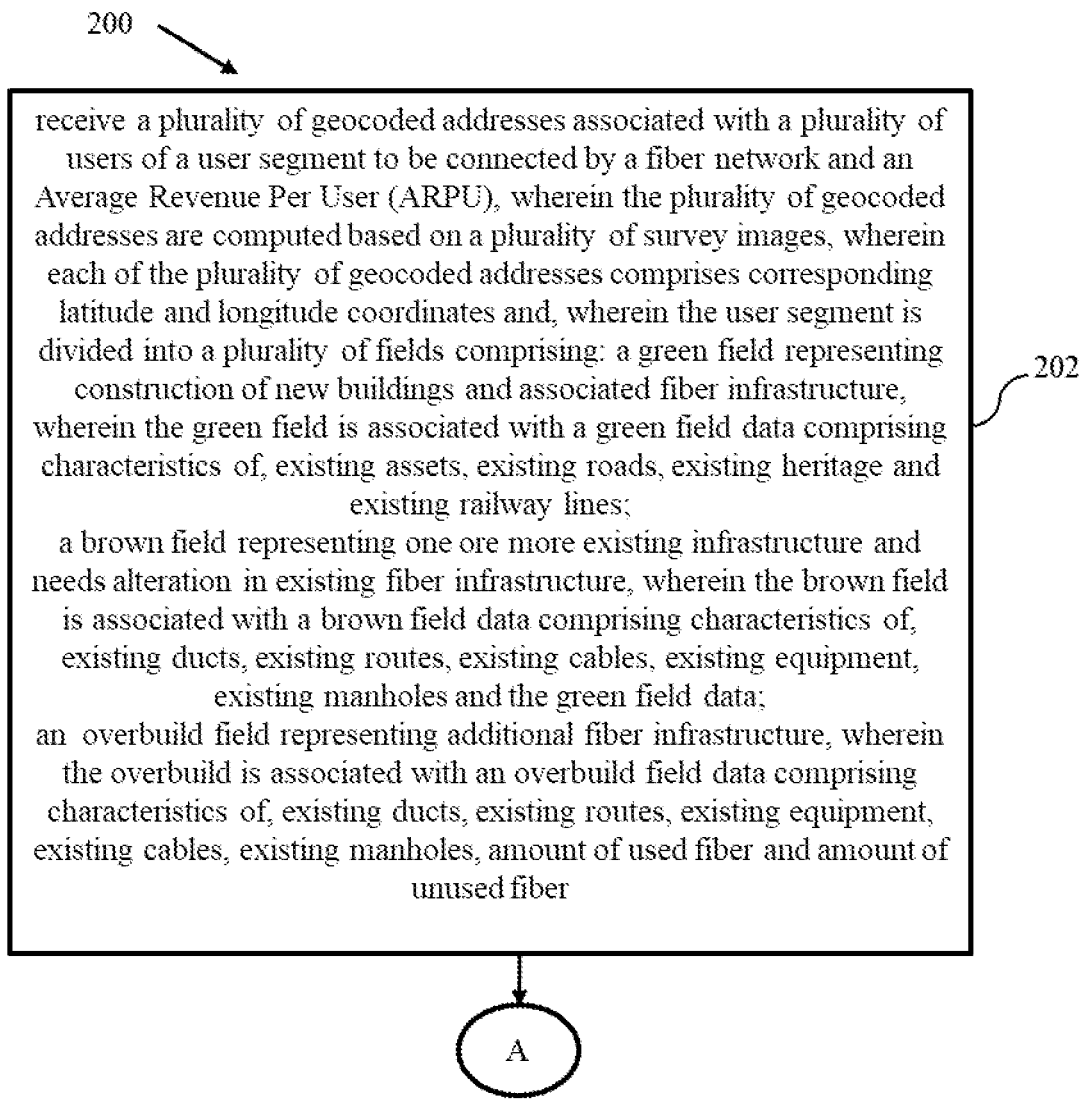
FIGS. 2A, 2B and 2C are exemplary flow diagrams for a method for design and engineering led fiber rollout implemented by the system of FIG. 1, in accordance with some embodiments of the present disclosure.
Figure 2B:
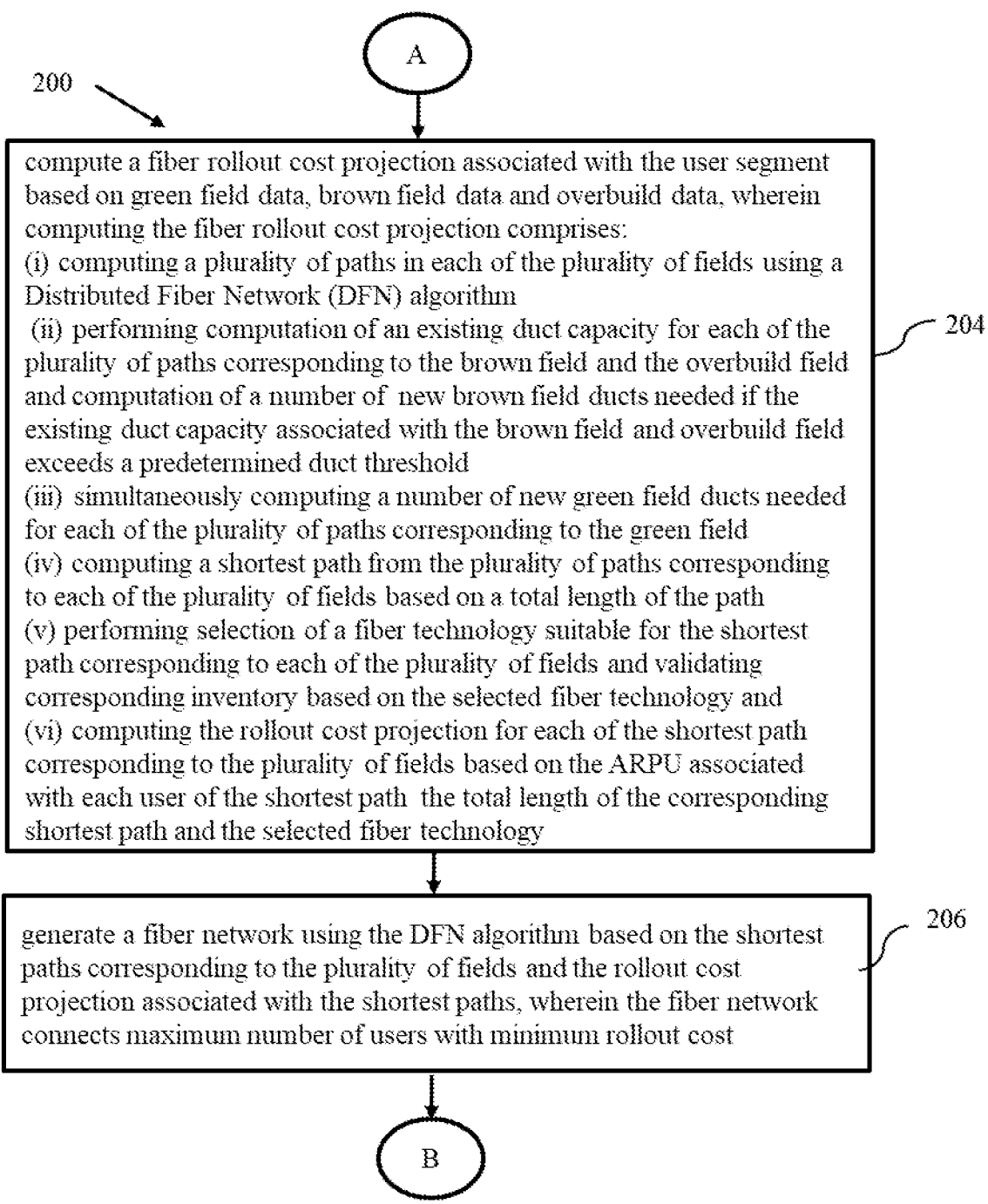
Figure 2C:
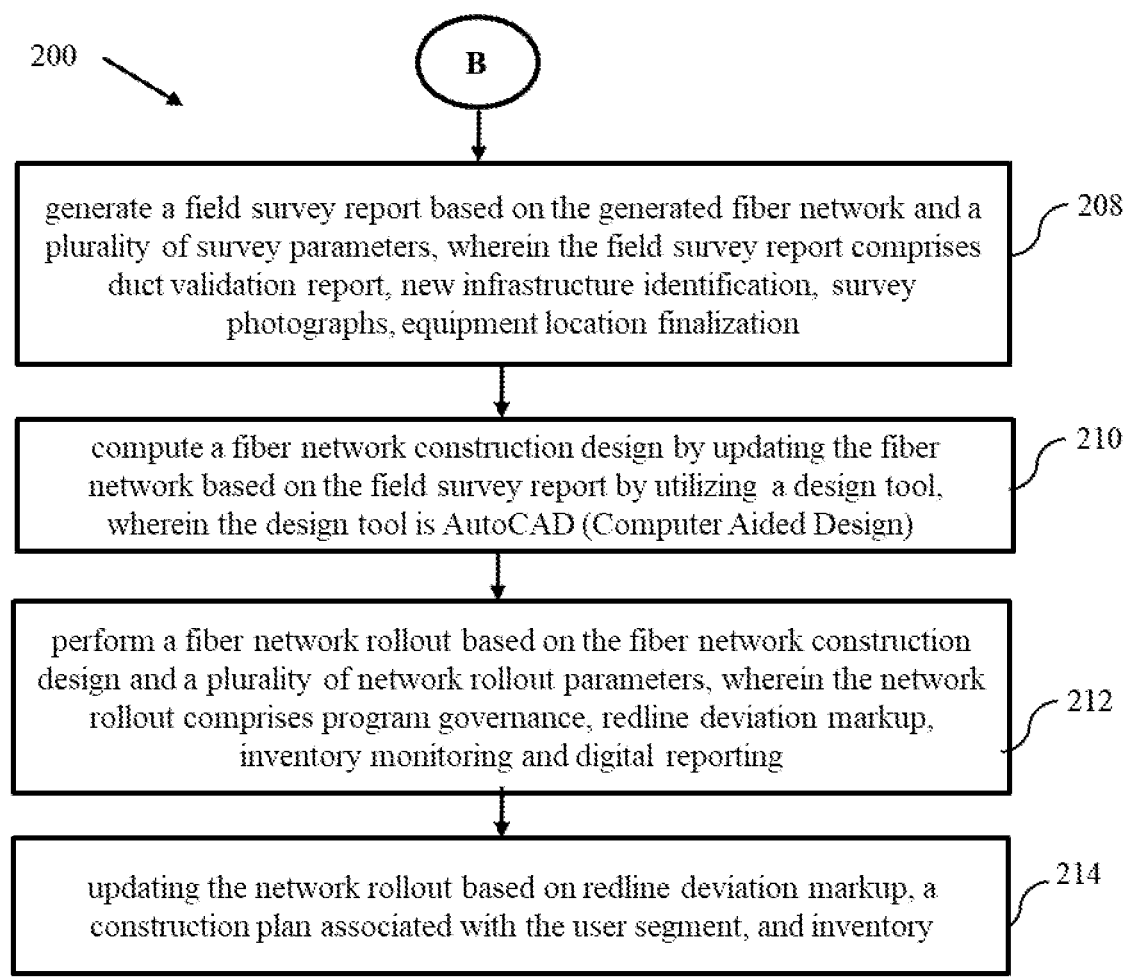

FIGS. 2A, 2B and 2C are exemplary flow diagrams for a processor implemented method for design and engineering led fiber rollout implemented by the system of FIG. 1, according to some embodiments of the present disclosure. In an embodiment, the system 100 comprises one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1 and the steps of flow diagram as depicted in FIG. 2. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At step 202 of the method 200, the one or more hardware processors (102) receive a plurality of geocoded addresses associated with a plurality of users of a user segment to be connected by a fiber network and an Average Revenue Per User (ARPU), wherein the user segment is divided into a plurality of fields including a green field, a brown field and an overbuild field. The green field represents construction of new buildings/infrastructure and associated fiber infrastructure. The green field is associated with a green field data including characteristics of, existing assets, existing roads, existing heritage and existing railway lines. The brown field represents existing building/infrastructure and needs alteration in existing fiber infrastructure. The brown field is associated with a brown field data including characteristics of, existing ducts, existing routes, existing cables, existing equipment, existing manholes and the green field data. The overbuild field represents additional fiber infrastructure. The overbuild is associated with an overbuild field data including characteristics of, existing ducts, existing routes, existing equipment, existing cables, existing manholes, amount of used fiber and amount of unused fiber. The plurality of geocoded addresses are computed by the system 100 based on a plurality of survey images, wherein each of the plurality of geocoded addresses includes corresponding latitude and longitude coordinates.

In an embodiment, the characteristics of existing asset includes name of the asset and geometry of the asset. The characteristics of existing road includes identification number of the road and geometry of the road. The characteristics of existing railway lines includes name of the railway line and geometry of the railway line. The characteristics of existing equipment includes name of the equipment, type of the equipment, technology of the equipment and identification number of the equipment. The characteristics of existing cables includes name of the cable, fiber count, start equipment, end equipment and technology of the cable. The characteristics of existing ducts includes name, size and length of the ducts. The characteristics of route/path includes length, start point and end point.

At step 204 of the method 200, the one or more hardware processors (102) compute a fiber rollout cost projection associated with the user segment based on the ARPU, the green field data, the brown field data and the overbuild data. The method of computing the fiber rollout cost projection includes the following steps: (i) initially a plurality of paths are computed in each of the plurality of fields using a Distributed Fiber Network (DFN) algorithm (ii) An existing duct capacity is computed for each of the plurality of paths corresponding to the brown field and the overbuild field and a number of new brown field ducts needed are computed, when the existing duct capacity associated with the brown field and overbuild field exceeds a predetermined duct threshold (iii) A number of new green field ducts needed for each of the plurality of paths corresponding to the green field is computed simultaneously (iv) A shortest path from the plurality of paths corresponding to each of the plurality of fields based on a total length of the path is computed (v) a fiber technology suitable for the shortest path corresponding to each of the plurality of fields is selected and validating corresponding inventory based on the selected fiber technology and (vi) The rollout cost projection for each of the shortest path corresponding to the plurality of fields is computed based on the ARPU associated with each of the plurality of users of the shortest path, the total length of the corresponding shortest path and the selected fiber technology. The fiber technology selection selects one of a FTTN (Fiber To The Node), a FTTH (Fiber To The Home), a FTTB (Fiber To The Building), a Copper, and a HFC (Hybrid Fiber-Coaxial).

The method of computing the plurality of paths in each of the plurality of fields by the DFN algorithm includes the following steps: (i) receiving the green field data, the brown field data and the overbuild data associated with the user segment. Each manhole associated with each of the plurality of fields is a node and a path connecting two manholes is an edge, forming a plurality of nodes and a plurality of edges (ii) a start node is selected from the plurality of nodes (iii) each of the plurality of unvisited nodes are traversed, starting from the start node and a plurality of child nodes associated with each of the plurality of nodes until a plurality of parameters are satisfied. The traversed nodes are marked as visited. The plurality of parameters includes at least one of, reaching a node with zero child, reaching a destination node and if distance between the start node and the destination node is above a predetermined distance threshold and (iv) closed paths are removed to obtain the plurality of paths, wherein the closed paths reaches the starting node forming a loop.

At 206 of the method 200, the one or more hardware processors (102) generates a fiber network using the DFN algorithm based on the shortest paths corresponding to the plurality of fields and the rollout cost projection associated with the shortest paths. The fiber network connects maximum number of users with minimum rollout cost.

The method of generating the fiber network using the DFN algorithm based on the shortest paths corresponding to the plurality of fields and the rollout cost projection associated with the shortest paths includes the following steps: (i) receiving the shortest paths, the rollout cost projection associated with each of the shortest paths and the plurality of geocoded addresses. Each geocoded address is a network node and a path connecting two geocoded addresses is a network edge, forming a plurality of network nodes and a plurality of network edges (ii) selecting a start network node from the plurality of network nodes (iii) traversing each network node which is unvisited through the shortest paths starting from the start network node and a plurality of child network nodes associated with each network node until a plurality of network parameters are satisfied. The traversed network nodes are marked as traversed. The plurality of network parameters includes at least one of, reaching a network node with zero child, reaching a destination network node connecting a predefined number of users and rollout cost projection between the start network node and the destination network node is above a predetermined cost threshold and (iv) removing closed paths to obtain the fiber network, wherein the closed paths reaches the start network node forming a loop.

At 208 of the method 200, the one or more hardware processors (102) generates a field survey report based on the generated fiber network and a plurality of survey parameters. The field survey report includes duct validation report, new infrastructure identification, survey photographs, and equipment location finalization. The equipment location provides the places where the equipment for network infrastructure can be placed. The plurality of survey parameters includes a field survey input report, asset demarcation, survey plan SLD (Single Line Diagram) and a resource plan. The resource plan allocates assets to a field engineer for survey. The SLD provides diagram of new network rollout which has all the splicing detail of equipment planned for the user segment.

At 210 of the method 200, the one or more hardware processors (102) computes a fiber network construction design by updating the fiber network based on the field survey report by utilizing a design tool. The design tool is AutoCAD (Computer Aided Design).

At 212 of the method 200, the one or more hardware processors (102) performs a fiber network rollout based on the fiber network construction design and a plurality of network rollout parameters. The network rollout parameters includes a construction plan, Bill of Material (BoM), Bill of Quantity (BoQ), permission plan, splicing characteristics with materials. The network rollout includes program governance, redline deviation markup, inventory monitoring, digital reporting and dashboard. The redline deviation markup provides a deviation in design, wherein the splicing characteristics includes connectivity of fiber network in strand level. The inventory monitoring includes monitoring whether characteristics of objects and assets required for the fiber network construction are available for the detailed design.

At 214 of the method 200, the one or more hardware processors (102) updates the network rollout based on redline deviation markup, a construction plan associated with the user segment, and the inventory.

Figure 3:
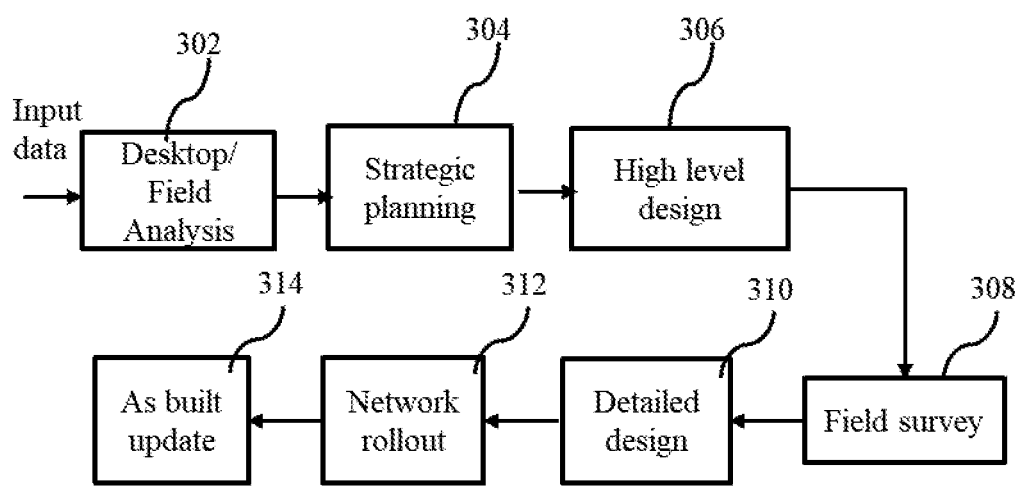
FIG. 3 illustrates a functional block diagram of the system of FIG. 1 for design and engineering led fiber rollout, in accordance with some embodiments of the present disclosure.

FIG. 3 illustrates a functional block diagram of the system of FIG. 1 for design and engineering led fiber rollout, in accordance with some embodiments of the present disclosure. Now referring to FIG. 3, the functional block diagram includes a field analysis module 302, strategic planning module 304, a high level design module 306, a field survey module 308, a detailed design module 310, a network rollout module 312 and an as built update module 314. In an embodiment, the modules explained with FIG. 3 are present in the fiber rollout analysis unit 114.

In an embodiment, the field analysis module 302 receives and analyzes the field data. Here, a network designer uploads a design data into the database using the dashboard. A supervisor or the network designer creates a plurality of jobs for field engineers based on the design data. The field engineers receives the allocated jobs from dashboard of the system 100 by logging in. The field engineers perform initial field survey and enters the survey data and associated survey images in the corresponding application dashboard of the system 100. The system provides an identification number to the survey data and computes the geocoded addresses associated with the survey data and the associated images. The survey data includes the user segment, the field data including the green field data, the brown field data and the overbuild data.

In an embodiment, the strategic planning module 304, computes the fiber rollout cost projection associated with the user segment based on the ARPU, the green field data, the brown field data and the overbuild data. The fiber rollout cost projection computation includes the following steps: (i) initially a the plurality of paths are computed in each of the plurality of fields using a Distributed Fiber Network (DFN) algorithm (ii) The existing duct capacity for each of the plurality of paths corresponding to the brown field and the overbuild field is computed and the number of new brown field ducts needed computed, when the existing duct capacity associated with the brown field and overbuild field exceeds the predetermined duct threshold (iii) the number of new green field ducts needed for each of the plurality of paths corresponding to the green field is computed simultaneously (iv) the shortest path from the plurality of paths is computed corresponding to each of the plurality of fields based on the total length of the path (v) the fiber technology suitable for the shortest path corresponding to each of the plurality of fields is selected and corresponding inventory is validated based on the selected fiber technology and (vi) the fiber rollout cost projection for each of the shortest path corresponding to the plurality of fields is computed based on the ARPU associated with each of the plurality of users of the shortest path, the total length of the corresponding shortest path and the selected fiber technology. The fiber technology selection selects one of a FTTN (Fiber To The Node), a FTTH (Fiber To The Home), a FTTB (Fiber To The Building), a Copper, and a HFC (Hybrid Fiber-Coaxial).

The method of computing the plurality of paths in each of the plurality of fields by the DFN algorithm includes the following steps: (i) receiving the green field data, the brown field data and the overbuild data associated with the user segment. Each manhole associated with each of the plurality of fields is a node and a path connecting two manholes is an edge, forming a plurality of nodes and a plurality of edges (ii) selecting the start node from the plurality of nodes (iii) traversing each of the plurality of nodes which are unvisited, starting from the start node and the plurality of child nodes associated with each of the plurality of nodes until the plurality of parameters are satisfied and the traversed nodes are marked as visited. The plurality of parameters includes at least one of, reaching a node with zero child, reaching a destination node and if distance between the start node and the destination node is above the predetermined distance threshold and (iv) removing closed paths to obtain the plurality of paths, wherein the closed paths reaches the starting node forming a loop.

In an embodiment, the DFN algorithm for computing the plurality of paths in the brown filed and the overbuild field is explained as follows: The DFN algorithm considers all path details, manholes details, duct details, equipment's details and save all the data in standard template library i.e maps, multimap, vectors etc.

In an embodiment, the DFN Algorithm for computing the plurality of paths in the brown filed and overbuild field starts to find a path for a given start node/pit (manhole) to the next available end point. This is like branching of one node (manhole) to many nodes (manhole) and is applicable for all nodes. The DFN algorithm traverses all the nodes and mark them as traversed. For example, if one pit/node has 4 connected pits/nodes, then the algorithm maintains a record of the pits/nodes for which it calculate the routes. The algorithm traverses till the destination (end node) or till the no of child of particular pit/node becomes zero. If destination or end node is reached, then that pit/node is marked as traversed. If the algorithm reaches end node where pit has zero child, then the pit/node is marked as traversed. If the distance between the start node and the end node reaches the pre-determined distance threshold, then that particular node is marked as traversed. In all the cases, once the node is marked as traversed then algorithm will not visit those nodes again and start finding another path from the start node. The distance between the start node and the end node is configurable and algorithm will have the capability to differentiate and calculate different distance between different start or end points. After reaching any of the aforesaid step, algorithm will reset to start traversing from the start node and exclude the particular nodes from the traversed list and calculate the distinct available path. The above process is repeated until all the nodes are traversed in the existing network. The DFN algorithm also solved the major challenge of closed loops like maze game. For example, reaching the node where it started. The DFN algorithm solves this puzzle and remove the closed loop while calculating the route. Once the plurality of paths computed, then the DFN algorithm checks for the capacity of existing ducts and calculate the duct capacity after pulling the new planned cable from the existing duct.

If after passing the cable, the duct capacity does not exceed the pre-determined duct threshold defined by the telecom company, then this duct will be used for planning. Otherwise system suggests to create the new duct as it is exceeding the pre-determined duct threshold. After calculating the duct capacity of each of the plurality of paths, the algorithm will calculate the shortest route on the basis of length of route and give all the routes to user with suggested shortest route. Further, the algorithm provides the route, duct and cable association.

In an embodiment, the DFN Algorithm for computing the plurality of paths in the green filed lays down all the routes and pits (manholes) on the basis of existing civils i.e roads, railways etc. before finding the shortest path. The DFN algorithm starts to find the path for the given start pit/node (manhole) to the next available end node. This is like branching of one node (manhole) to many node (manhole) and is applicable for all node. The algorithm traverses all node and marks then as traversed. For example, if one node has 4 connected nodes then algorithm maintains a record of the nodes to calculate the paths. The algorithm traverses till the end node or till the no of child of particular pit become zero. If the algorithm reaches end node, then that that node is marked as traversed. If the algorithm reaches the end node, where node has zero child then the node is marked as traversed. If the distance between the start node and last node is reached, then that particular node is marked as traversed. In all the cases, once a node is marked as traversed then algorithm does not visit those nodes again and start finding another path from the start node. The distance between start and end node is configurable and the algorithm is capable of differentiating and calculating different distance between different start and end nodes. After reaching any of the aforesaid conditions, algorithm does reset to start the path finding from the start node and exclude particular nodes from the traversed list and calculate the different available path. The above process is repeated till all the nodes are traversed in the existing network. The algorithm further solves the major challenge of closed loops, where it reaches the start node after traversing other nodes. Algorithm solves this puzzle also and remove the closed loop while calculating the route. In green field, all the route is newly constructed so the algorithm lays down all the new ducts as per defined set of configurable rules of the telecom company. After calculating the capacity of the duct of the plurality of routes/paths, the algorithm calculates the shortest path based on length of route and give all the routes to user with suggested shorted route. Algorithm will also give the route duct and cable association.

In an embodiment, the high level design module 306 generates the fiber network using the DFN algorithm based on the shortest paths corresponding to the plurality of fields and the fiber rollout cost projection associated with the shortest paths, wherein the fiber network connects maximum number of users with minimum fiber rollout cost. The high level design module draft initial BoM/BoQ, approval plans, existing asset identification for field verification. The approval plans provides permissions and approvals required from different government authorities for the field verification and fiber network construction. The field verification provides survey of the field before finalizing the network laydown route and validates the field whether the desktop network path finalized is feasible to be constructed practically.

The method of generating the fiber network using the DFN algorithm based on the shortest paths corresponding to the plurality of fields and the fiber rollout cost projection associated with the shortest paths includes the following steps: (i) receiving the shortest paths, the fiber rollout cost projection associated with each of the shortest paths and the plurality of geocoded addresses, wherein each geocoded address is the network node and the path connecting two geocoded addresses is the network edge, forming the plurality of network nodes and the plurality of network edges (ii) selecting the start network node from the plurality of network nodes (iii) traversing each network node which is unvisited through the shortest paths starting from the start network node and the plurality of child network nodes associated with each network node until the plurality of network parameters are satisfied, wherein the traversed network nodes are marked as traversed, wherein the plurality of network parameters including at least one of, reaching a network node with zero child, reaching a destination network node connecting a predefined number of users and fiber rollout cost projection between the start network node and the destination network node is above the predetermined cost threshold and (iv) removing closed paths to obtain the fiber network, wherein the closed paths reaches the start network node forming a loop.

In an embodiment, after generating the fiber network or optimized network plan, the system 100 computes the draft BOM/BOQ based on the planned infrastructure, inventories, i.e., paths, ducts, cables, manholes and equipment's (joints, splitters etc.,). The system 100 includes an Admin GUI (Graphical User Interface) to add the cost of inventories, laydown of paths and ducts. Further, the system 100 computes a total BOM/BOQ using the planned network and enters the cost in system and sends e-mail to corresponding stakeholders i.e., triggers the high level design to the telecom company & SCM (Supply Chain Management) to initiate procurement of required inventory.

In an embodiment, the field survey module 308 generates the field survey report based on the generated fiber network and the plurality of survey parameters, wherein the field survey report includes duct validation report, new infrastructure identification, survey photographs, equipment location finalization. The plurality of survey parameters includes the field survey input report, asset demarcation, survey plan SLD (Single Line Diagram) and the resource plan, wherein the resource plan allocates assets to a field engineer for survey, and wherein the SLD provides diagram of new network rollout which has all the splicing detail of equipment planned for the user segment.

In an embodiment, after the approval of the high-level design by the corresponding stakeholders, all the field tasks are automatically assigned to field engineer as per their area. Automatic e-mail is triggered to respective stakeholder when the task is assigned. Field supervisor has the authority to override the automatic assignment. The field engineer visits the field and captures images of ducts, their start node and end node and uploads in the system 100 for validation by the designer. The field survey module is capable to chat with the planner during the field visit. Further, the system 100 is capable of auto verification of the field job submitted by the field engineer and generate the report on daily basis and send it over e-mail to all stakeholders. Further, the system enables field engineer to update the design in real time according to design rules defined for specific geo/location.

In an embodiment, the system 100 can run as a web based application with 3 tiers of hierarchy. The 3 tiers of hierarchy includes designers, supervisors and field engineers. The application is capable of being executed on any browser regardless of the platform. No installation is required for end users and includes a plurality of advantages like, minimal data is saved on the client/device and accessible anywhere. Further, the data is centralized and data integrity is provided. The access to the application is provides on role basis to ensure security. Further, custom rules are applied to facilitate auto-acceptance/rejection of assets. All deliverables of accepted assets are generated through the application. Dashboard views are provided to enhance tracking of open/in-progress artefacts. Further, the system generates invoices automatically when the field work completed.

In an embodiment, the detailed design module 310 computes the fiber network construction design by updating the fiber network based on the field survey report by utilizing the design tool, wherein the design tool is AutoCAD (Computer Aided Design).

In an embodiment, after completing the field survey, when all the assets are accepted, the system 100 updates the high level design/generated fiber network to final design/the fiber network construction design after incorporating the changes that came during field survey. Once the design is updated, the system 100 generates splicing detail for each joint and splitter planned in the network i.e., for each equipment, number of incoming fiber, number of outgoing fiber, number of dead fiber, number of spliced fiber etc. Further, complete detail of each equipment is generated. The splicing details are also used in preparing the SLD for the complete network. The detail of splicing is displayed in SLD for each equipment's. PDF layout of SLD is generated for each splitter.

In an embodiment, the network rollout module 312 performs the fiber network rollout based on the fiber network construction design and the plurality of network rollout parameters, wherein the network rollout parameters includes a fiber network construction plan, Bill of Material (BoM), Bill of Quantity (BoQ), permission plan, splicing characteristics with materials, wherein the network rollout includes program governance, redline deviation markup, inventory monitoring, digital reporting and dashboard. The redline deviation markup provides a deviation in design. The splicing characteristics includes connectivity of fiber network in strand level. The inventory monitoring includes monitoring whether characteristics of objects and assets required for the fiber network construction are available for the detailed design. The permission plan provides plan and documentation required to take various permits and approvals for the fiber network construction.

In an embodiment, after the generation of SLD and splicing reports for each equipment, then the fiber network construction plan and BOM/BOQ is generated for final approved design. Automatic beautification of construction drawing file is done in AutoCAD then generation of pdf layout of the fiber network construction plan is performed. All the artefacts of particular site are uploaded in the system and final e-mail is triggered to all stakeholder for construction of fiber network for that particular site. Once the construction partner accepts the design for construction then automatic allocation of field engineer to construct the sites is done. The field supervisor has the authority to override the automatic assignment.

In an embodiment, the as built update module 314 updates the network rollout based on redline deviation markup, the fiber network construction plan associated with the user segment, and the inventory.

In an embodiment, once the fiber network construction is initiated, the system 100 has the capability to measure (i) resource requirement versus design (as per the productivity matrix provided by a contractor) (ii) resource mapping & alignment (resource alignment per design per activity) (iii)

resource governance as per the productivity matrix (360 degrees real time view) (iv) Inventory consumption with real time trigger and view the address shortage while in construction phase (v) All reports and documents are handy and accessible via construction app, webpage (vi) Local commune & authority approvals are aligned to inventory in the application so that the same can be used during fiber construction in case of hurdles during execution (vii) All the redline mark-up are updated in system on day to day basis and report of all redline mark ups is generated and shared to stakeholder at submission of each redline mark up.

Figure 4:
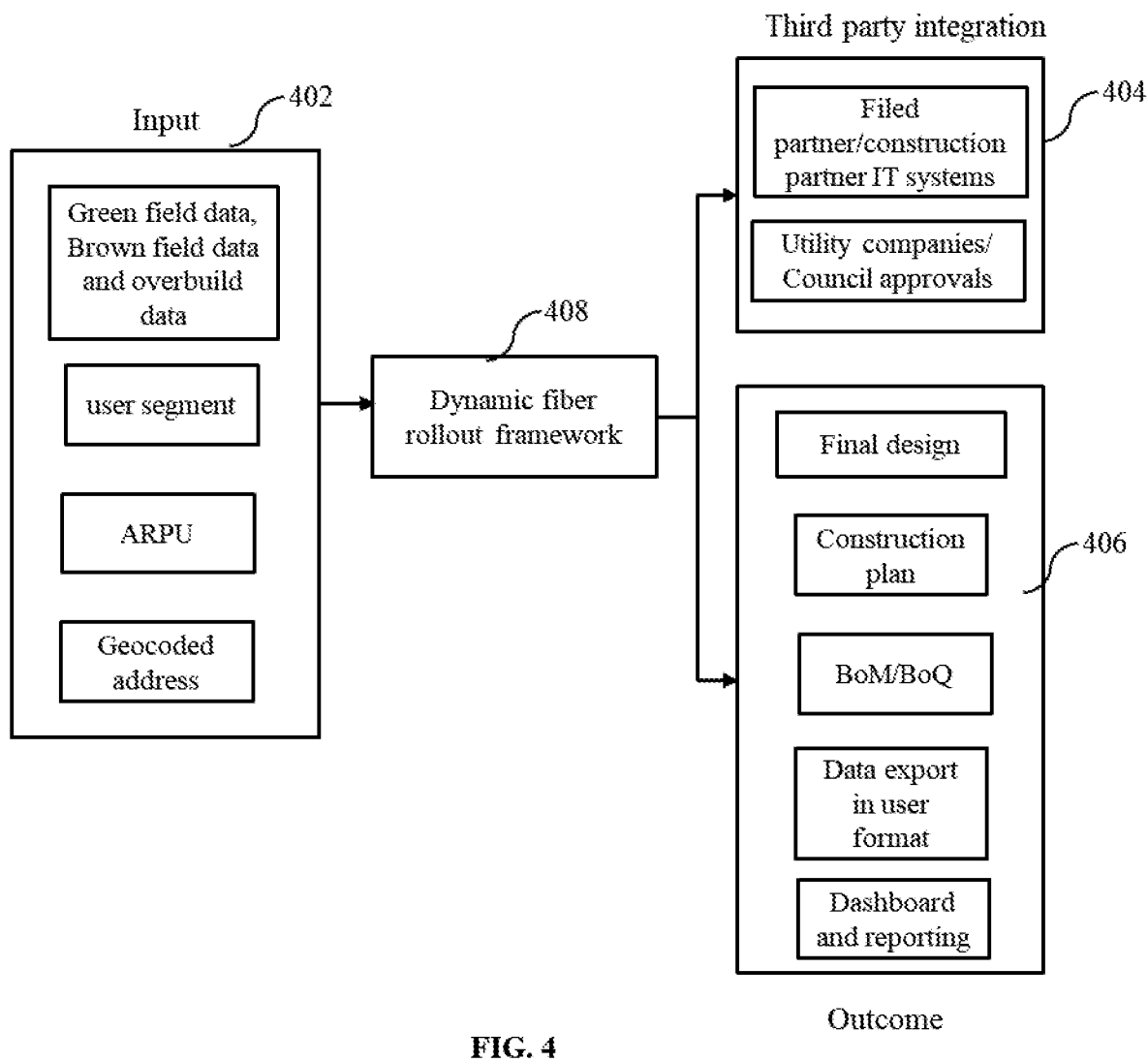
FIG. 4 illustrates an overall functional framework of the system of FIG. 1 for design and engineering led fiber rollout, in accordance with some embodiments of the present disclosure.

FIG. 4 illustrates an overall functional framework of the system of FIG. 1 for design and engineering led fiber rollout, in accordance with some embodiments of the present disclosure. Now referring to FIG. 4, the overall functional framework includes an input module 402, a dynamic fiber rollout framework 404, a third party integration module 406, and an outcome module 408.

In an embodiment, the input module 402 receives input data including the user segment, the ARPU, the plurality of geocoded addresses associated with the plurality of users of the user segment. The user segment is divided into the plurality of fields including the green field, the brown field and the overbuild field. The green field is associated with the green field data, the brown field is associated with the brown field data and the overbuild build field is associated with the overbuild data. The user segment is a group of users/homes to be connected by a particular fiber network technology. Here, the system receives the survey images of the user segment, captured by the field engineers and converts street addresses into geographic coordinates including latitude and longitude coordinates. The geographical coordinates can be used to place markers on a map of the user segment or can be used to position the map of the user segment.

In an embodiment, the third party integration module 406 includes a module with Field partner/construction partner IT (Information Technology) systems and a module for utility companies/council approvals. The module with Field partner/construction partner IT systems integrates other commercially available plan and design software to the system 100. The module for utility companies/council approvals send and receive emails regarding approvals and provide other communications to other utility companies.

In an embodiment, the outcome module 408 provides the final design (the fiber network construction design) of the fiber network, the construction plan for the fiber network drawn using AutoCAD, the BOM/BoQ, a data export in user format if any user request, dashboard and reporting. The everyday activity regarding the fiber rollout can be viewed using dashboard and the necessary reports can be generated.

Figure 5:
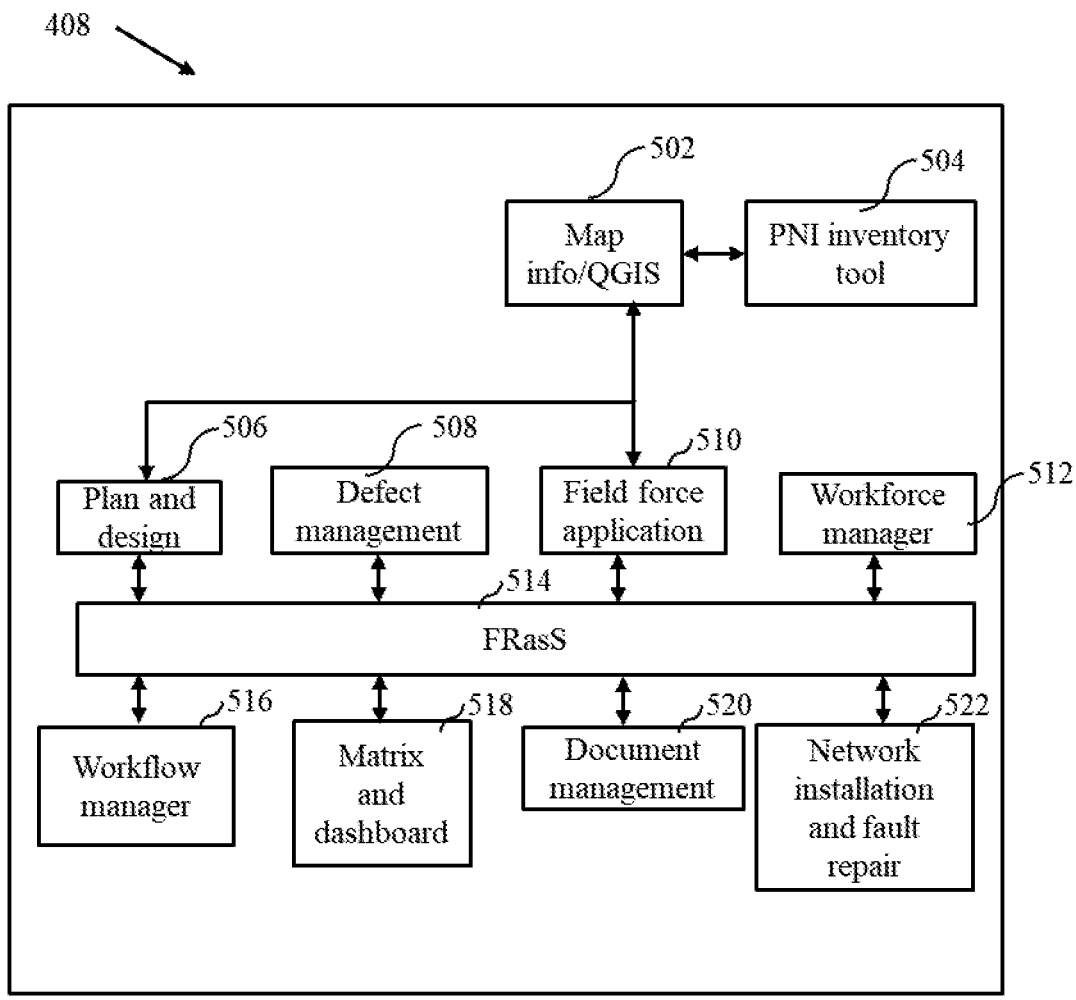
FIG. 5 illustrates a functional block diagram of a dynamic fiber rollout framework of FIG. 4, in accordance with some embodiments of the present disclosure.

FIG. 5 illustrates a functional block diagram of a dynamic fiber rollout framework of FIG. 4, in accordance with some embodiments of the present disclosure. Now referring to FIG. 5, the dynamic fiber rollout framework 408 of the FIG. 4 is depicted in detail. The dynamic fiber rollout framework 408 includes a Map information//QGIS (Quantum Geographical Information System) 502 module, a PNI (Physical Network Inventory) tool module 504, a rest APIs module 506, a Plan and design module 508, a defect management module 510, a field force application module 512, a workforce manager module 514, a FRaaS (Fiber Rollout as a Service) 516 to connect other modules, a workflow manager module 518, a Matrix and dashboard module 520, a document management module 522, a Network installation and fault repair module 522.

The Map info/QGIS 502 module is used for performing network planning. The PNI inventory tool module 504 maintains a physical and logical inventory of network. The Plan and design module 506 provides an integrated workbench for automating plan and design activities. Further, the module 506 provides real time update for field survey and as-build & redlining real-time update. The defect management module 508 provides a comprehensive defect management tool. A plurality of defects are updated in the defect management tool and the system 100 will not allow to move next phase without rectifying the plurality of defects. The field force application module 510 is capable of bringing field inputs to a common interface for analysis, providing solution in real time. Further, it provides process automation on receipt of the field data and automated validation of the field data based on preliminary data.

The workforce manager module 512, provides a real-time software centric workforce alignment & tracking. This module allocates the assets to field engineer for filed survey and the fiber network construction. Further, tracks and publish the report of each field engineer's activity. The workflow manager module 516 provides a workflow automation across multiple stakeholders. This module is used to track the assigned activity from network planning to fiber network construction. The Matrix and dashboard module 518 is a single source of truth for all stakeholders. This module consolidates the status of all the sites. The progress of each individual site of fiber rollout can be checked using this module 518. The document management module 520 is a Network planning site specific repository of all the documents. The Network installation and fault repair module 522 provides network enablement, Installation & Fault Repair. Further, the module 522 provides remote network enablement, order provisioning & service assurance of work order and SCM Inventory tracking.

The fiber rollout analysis unit 114, executed by the one or more processors of the system 100, receives the plurality of geocoded addresses associated with a plurality of users of the user segment to be connected by the fiber network and the Average Revenue Per User (ARPU), wherein the user segment is divided into a plurality of fields including the green field, the brown field and the overbuild field. The green field needs construction of new buildings/infrastructure and associated fiber infrastructure. The green field is associated with the green field data including characteristics of, existing assets, existing roads, existing heritage and existing railway lines. The brown field includes existing building/infrastructure and needs alteration in existing fiber infrastructure. The brown field is associated with the brown field data including characteristics of, existing ducts, existing routes, existing cables, existing equipment, existing manholes and the green field data. The overbuild field needs additional fiber infrastructure. The overbuild is associated with the overbuild field data including characteristics of, existing ducts, existing routes, existing equipment, existing cables, existing manholes, amount of used fiber and amount of unused fiber. The plurality of geocoded addresses are computed based on the plurality of survey images, wherein each of the plurality of geocoded addresses includes corresponding latitude and longitude coordinates.

Further, the fiber rollout analysis unit 114, executed by one or more processors of the system 100, computes the fiber rollout cost projection associated with the user segment based on the ARPU, the green field data, the brown field data and the overbuild data, wherein computing the fiber rollout cost projection includes the following steps: (i) computing the plurality of paths in each of the plurality of fields using a Distributed Fiber Network (DFN) algorithm (ii) performing computation of the existing duct capacity for each of the plurality of paths corresponding to the brown field and the overbuild field and computation of the number of new brown field ducts needed if the existing duct capacity associated with the brown field and overbuild field exceeds the predetermined duct threshold (iii) simultaneously computing the number of new green field ducts needed for each of the plurality of paths corresponding to the green field (iv) computing the shortest path from the plurality of paths corresponding to each of the plurality of fields based on the total length of the path (v) performing selection of the fiber technology suitable for the shortest path corresponding to each of the plurality of fields and validating corresponding inventory based on the selected fiber technology and (vi) computing the fiber rollout cost projection for each of the shortest path corresponding to the plurality of fields based on the ARPU associated with each of the plurality of users of the shortest path, the total length of the corresponding shortest path and the selected fiber technology. The fiber technology selection selects one of a FTTN (Fiber To The Node), a FTTH (Fiber To The Home), a FTTB (Fiber To The Building), a Copper, and a HFC (Hybrid Fiber-Coaxial). The method of computing the plurality of paths in each of the plurality of fields by the DFN algorithm includes the following steps: (i) receiving the green field data, the brown field data and the overbuild data associated with the user segment, wherein each manhole associated with each of the plurality of fields is a node and a path connecting two manholes is an edge, forming a plurality of nodes and a plurality of edges (ii) selecting the start node from the plurality of nodes (iii) traversing each of the plurality of nodes which are unvisited, starting from the start node and the plurality of child nodes associated with each of the plurality of nodes until the plurality of parameters are satisfied, wherein the traversed nodes are marked as visited, wherein the plurality of parameters including at least one of, reaching a node with zero child, reaching a destination node and if distance between the start node and the destination node is above the predetermined distance threshold and (iv) removing closed paths to obtain the plurality of paths, wherein the closed paths reaches the starting node forming a loop.

Further, the fiber rollout analysis unit 114, executed by one or more processors of the system 100, generates the fiber network using the DFN algorithm based on the shortest paths corresponding to the plurality of fields and the fiber rollout cost projection associated with the shortest paths, wherein the fiber network connects maximum number of users with minimum fiber rollout cost. The method of generating the fiber network using the DFN algorithm based on the shortest paths corresponding to the plurality of fields and the fiber rollout cost projection associated with the shortest paths includes the following steps: (i) receiving the shortest paths, the fiber rollout cost projection associated with each of the shortest paths and the plurality of geocoded addresses, wherein each geocoded address is the network node and the path connecting two geocoded addresses is the network edge, forming the plurality of network nodes and the plurality of network edges (ii) selecting the start network node from the plurality of network nodes (iii) traversing each network node which is unvisited through the shortest paths starting from the start network node and the plurality of child network nodes associated with each network node until the plurality of network parameters are satisfied, wherein the traversed network nodes are marked as traversed, wherein the plurality of network parameters including at least one of, reaching a network node with zero child, reaching a destination network node connecting a predefined number of users and fiber rollout cost projection between the start network node and the destination network node is above a predetermined cost threshold and (iv) removing closed paths to obtain the fiber network, wherein the closed paths reaches the start network node forming a loop.

Further, the fiber rollout analysis unit 114, executed by one or more processors of the system 100, generates the field survey report based on the generated fiber network and the plurality of survey parameters, wherein the field survey report includes duct validation report, the new infrastructure identification, survey photographs, equipment location finalization. The plurality of survey parameters includes the field survey input report, asset demarcation, survey plan SLD (Single Line Diagram) and the resource plan, wherein the resource plan allocates assets to a field engineer for survey, and wherein the SLD provides diagram of new network rollout which has all the splicing detail of equipment planned for the user segment. The new infrastructure identification identifies the areas where new construction will be needed and existing infrastructure cannot be used due to reasons including non-availability of space, broken infrastructure etc. The equipment location finds out the places where the equipment for network infrastructure can be placed.

Further, the fiber rollout analysis unit 114, executed by one or more processors of the system 100, computes the fiber network construction design by updating the fiber network based on the field survey report by utilizing the design tool, wherein the design tool is AutoCAD (Computer Aided Design). Further, the fiber rollout analysis unit 114, executed by one or more processors of the system 100, performs the fiber network rollout based on the fiber network construction design and the plurality of network rollout parameters, wherein the network rollout parameters includes a construction plan, Bill of Material (BoM), Bill of Quantity (BoQ), permission plan, splicing characteristics with materials, wherein the network rollout includes program governance, redline deviation markup, inventory monitoring, digital reporting and dashboard, wherein redline deviation markup provides a deviation in design, wherein the splicing characteristics includes connectivity of fiber network in strand level. The inventory monitoring includes monitoring whether characteristics of objects and assets required for construction are available for the detailed design.

Further, the fiber rollout analysis unit 114, executed by one or more processors of the system 100, updates the network rollout based on redline deviation markup, the construction plan associated with the user segment, and the inventory.

In an embodiment, based on the technology type chosen and the state of existing network inventory, the system 100 provides insights into the expected Rate on Investment to Telecom Company. Further, the strategic network planning module provides strategic decisions for fiber rollout based on minimum cost and max Return On Investment (ROI) to strengthen the business case and by leveraging the accuracy of GIS data. It helps us to lower the costs of project by comparing fiber architectures and target regions.

In an embodiment, the system 100 provides an optimized and constructible fiber network design by detecting the defects in the early stage. The detection of defects earlier in lifecycle leads to much lower costs in constructions. Further, the present disclosure manages multi stakeholder dependencies spread across design teams, construction teams, power companies, EHS (Environment Health and Safety) Compliance bodies and so on through integrated workflow.

Further, the present disclosure provides Process Excellence by digitization of the end to end process across all stakeholders and use integrated workflow. Further, the present disclosure define and deploy a plurality of metrics to improve the process outcomes (design accuracy, speed, cost per home passed). Further, the present disclosure pre-empt construction related delays through Joint Field Walkouts.

Further, the present disclosure provides automation and technology infusion by automating the design processes and field survey processes. Further, the present disclosure focuses on business outcome by leveraging best practices from executing large design operations for global business operators. It provides faster time to market 2× times faster and design delivery speed than other players. The present disclosure provides tremendous scalability and flexibility. Further, the present disclosure focuses on cost without compromising the speed and quality using right first time design approach. It further minimizes rework. The delivery service is provided through most optimal Onsite-Offshore mix using Global Network Delivery Model.

Further, the present disclosure is an outcome based approach with End to End Ownership. The End to end ownership of all tasks involved in Plan and Design such as Field Survey, Approvals from authorities, supporting construction etc. Supplementation of design expertise with significant local specialists who know the local site providers, utility companies, and have existing relationships with the construction contractors.

Further, the present disclosure provides construction governance and as-built support using its 360 Degree view of the construction activities, including slippages on the BoM/BoQ.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of dynamic fiber rollout management. The present disclosure offers a scalable design throughput, encompassing within itself all the auxiliary functions along with Fiber network Plan and Design, leading to a higher throughput and faster time to market for fiber operators. Further, the present disclosure is an outcome based commercial model which provides a design and engineering led solution for fiber rollout, based on software design principles.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, the method comprising:
   receiving, by one or more hardware processors, a plurality of geocoded addresses associated with a plurality of users of a user segment to be connected by a fiber network and an Average Revenue Per User (ARPU), wherein the plurality of geocoded addresses, comprising corresponding latitude and longitude coordinates, are computed based on a plurality of survey images, and wherein the user segment is divided into a plurality of fields comprising:
- a green field representing construction of new infrastructure and associated fiber infrastructure, wherein the green field is associated with a green field data comprising characteristics of, existing assets, existing roads, existing heritage and existing railway lines;
- a brown field representing one or more existing infrastructure and needs alteration in existing fiber infrastructure, wherein the brown field is associated with a brown field data comprising characteristics of existing ducts, existing routes, existing cables, existing equipment, existing manholes and the green field data; and
- an overbuild field representing additional fiber infrastructure, wherein the overbuild is associated with an overbuild field data comprising characteristics of existing ducts, existing routes, existing equipment, existing cables, existing manholes, amount of used fiber and amount of unused fiber;

computing, by the one or more hardware processors, a fiber rollout cost projection associated with the user segment based on the ARPU, the green field data, the brown field data and the overbuild data, wherein computing the fiber rollout cost projection comprises:

computing a plurality of paths in each of the plurality of fields using a Distributed Fiber Network (DFN) algorithm, wherein computing the plurality of paths in each of the plurality of fields by the DFN algorithm comprising:
- receiving the green field data, the brown field data and the overbuild data associated with the user segment, wherein each manhole associated with each of the plurality of fields is a node and a path connecting two manholes is an edge, forming a plurality of nodes and a plurality of edges;
- selecting a start node from the plurality of nodes;
- traversing each of the plurality of nodes which are unvisited, starting from the start node and a plurality of child nodes associated with each of the plurality of nodes until a plurality of parameters are satisfied, wherein the traversed nodes are marked as visited, and wherein the plurality of parameters comprising at least one of, reaching a node with zero child, reaching a destination node and distance between the start node and the destination node is above a predetermined distance threshold; and
- removing closed paths to obtain the plurality of paths, wherein the closed paths reach the start node forming a loop;
  - performing a) computation of an existing duct capacity for each of the plurality of paths corresponding to the brown field and the overbuild field and in response to the existing duct capacity associated with the brown field and overbuild field exceeding in a predetermined duct threshold, b) computation of a number of new brown field ducts needed;
  - simultaneously computing a number of new green field ducts needed for each of the plurality of paths corresponding to the green field;
  - computing a shortest path from the plurality of paths corresponding to each of the plurality of fields based on a total length of a path;
- performing selection of a fiber technology suitable for the shortest path corresponding to each of the plurality of fields and validating corresponding inventory based on the selected fiber technology; and
- computing the fiber rollout cost projection for each of the shortest path corresponding to the plurality of fields based on the ARPU associated with each of the plurality of users of the shortest path, the total length of the corresponding shortest path and the selected fiber technology;

generating, by the one or more hardware processors, a fiber network using the DFN algorithm based on the shortest paths corresponding to the plurality of fields and the fiber rollout cost projection associated with the shortest paths, wherein the fiber network connects maximum number of users with minimum fiber rollout cost, wherein generating the fiber network using the DFN algorithm based on the shortest paths corresponding to the plurality of fields and the fiber rollout cost projection associated with the shortest paths comprising:
- receiving the shortest paths, the fiber rollout cost projection associated with each of the shortest paths and the plurality of geocoded addresses, wherein each geocoded address is a network node and a path connecting two geocoded addresses is a network edge, forming a plurality of network nodes and a plurality of network edges;
- selecting a start network node from the plurality of network nodes;
- traversing each network node which is unvisited through the shortest paths starting from the start network node and a plurality of child network nodes associated with each network node until a plurality of network parameters are satisfied, wherein the traversed network nodes are marked as traversed, and wherein the plurality of network parameters comprising at least one of, reaching a network node with zero child, reaching a destination network node connecting a predefined number of users and the fiber rollout cost projection between the start network node and the destination network node is above a predetermined cost threshold; and
- removing closed paths to obtain the fiber network, wherein the closed paths reaches the start network node forming a loop;

generating, by the one or more hardware processors, a field survey report based on the generated fiber network and a plurality of survey parameters, wherein the field survey report comprises duct validation report, new infrastructure identification, survey photographs, equipment location finalization, wherein the plurality of survey parameters includes a field survey input report, an asset demarcation, survey plan SLD (Single Line Diagram) and a resource plan, wherein the SLD provides a design of a new network rollout which comprises splicing details of the equipment planned for the user segment and automatically beautifying a construction drawing file and generating a pdf layout of a fiber network construction plan, wherein artefacts of a particular site are uploaded in a system and a final e-mail is triggered to one or more stakeholders for construction of a fiber network for a particular site;

automatically assigning by the one or more hardware processors, a plurality of field tasks upon approval of the design, and an automatic e-mail is triggered to a stakeholder when the plurality of field tasks are assigned;

auto-verifying by the one or more hardware processors, one or more field jobs submitted by a field engineer and generating a report on a daily basis;

executing by the one or more hardware processors, application to be executed on any browser wherein a installation is not required for end users and generating an invoice automatically when the one or more field jobs are completed;

computing, by the one or more hardware processors, a fiber network construction design by updating the fiber network based on the field survey report by utilizing a design tool, wherein the design tool is AutoCAD (Computer Aided Design);

performing, by the one or more hardware processors, a fiber network rollout based on the fiber network construction design and a plurality of network rollout parameters, wherein the fiber network rollout comprises program governance, redline deviation markup, inventory monitoring and digital reporting, wherein the redline deviation markup provides a deviation in the design, wherein the splicing detail of the equipment includes connectivity of the fiber network at strand level and wherein the inventory monitoring includes monitoring whether characteristics of objects and assets required for the fiber network construction are available for the detailed design;

updating, in real-time by the one or more hardware processors, the fiber network rollout based on redline deviation markup, a construction plan associated with the user segment, and the inventory, and automatically allocating a field engineer upon acceptance of the design for construction.

2. The processor implemented method of claim 1, wherein the fiber technology selection selects one of a FTTN (Fiber To The Node), a FTTH (Fiber To The Home), a FTTB (Fiber To The Building), a Copper, and a HFC (Hybrid Fiber-Coaxial).

3. The processor implemented method of claim 1, wherein the network rollout parameters comprises a construction plan, Bill of Material (BOM), Bill of Quantity (BoQ), permission plan, splicing characteristics with materials.

4. A system comprising:
at least one memory storing programmed instructions;
one or more Input/Output (I/O) interfaces; and
one or more hardware processors operatively coupled to the at least one memory, wherein the one or more hardware processors are configured by the programmed instructions to:
  receive a plurality of geocoded addresses associated with a plurality of users of a user segment to be connected by a fiber network and an Average Revenue Per User (ARPU), wherein the plurality of geocoded addresses, comprising corresponding latitude and longitude coordinates, are computed based on a plurality of survey images, and wherein the user segment is divided into a plurality of fields comprising:
    a green field representing construction of new infrastructure and associated fiber infrastructure, wherein the green field is associated with a green field data comprising characteristics of, existing assets, existing roads, existing heritage and existing railway lines;
    a brown field representing one or more existing infrastructure and needs alteration in existing fiber infrastructure, wherein the brown field is associated with a brown field data comprising characteristics of existing ducts, existing routes, existing cables, existing equipment, existing manholes and the green field data; and
    an overbuild field representing additional fiber infrastructure, wherein the overbuild is associated with an overbuild field data comprising characteristics of existing ducts, existing routes, existing equipment, existing cables, existing manholes, amount of used fiber and amount of unused fiber;
  compute a fiber rollout cost projection associated with the user segment based on the ARPU, the green field data, the brown field data and the overbuild data, wherein computing the fiber rollout cost projection comprises:
  computing a plurality of paths in each of the plurality of fields using a Distributed Fiber Network (DFN) algorithm, wherein computing the plurality of paths in each of the plurality of fields by the DFN algorithm comprising:
    receiving the green field data, the brown field data and the overbuild data associated with the user segment, wherein each manhole associated with each of the plurality of fields is a node and a path connecting two manholes is an edge, forming a plurality of nodes and a plurality of edges;
    selecting a start node from the plurality of nodes;
    traversing each of the plurality of nodes which are unvisited, starting from the start node and a plurality of child nodes associated with each of the plurality of nodes until a plurality of parameters are satisfied, wherein the traversed nodes are marked as visited, and wherein the plurality of parameters comprising at least one of, reaching a node with zero child, reaching a destination node and distance between the start node and the destination node is above a predetermined distance threshold; and
    removing closed paths to obtain the plurality of paths, wherein the closed paths reach the start node forming a loop;
    performing computation of a) an existing duct capacity for each of the plurality of paths corresponding to the brown field and the overbuild field and b) computation of a number of new brown field ducts needed, if the existing duct capacity associated with the brown field and overbuild field exceeds a predetermined duct threshold;
    simultaneously computing a number of new green field ducts needed for each of the plurality of paths corresponding to the green field;
    computing a shortest path from the plurality of paths corresponding to each of the plurality of fields based on a total length of a path;
    performing selection of a fiber technology suitable for the shortest path corresponding to each of the plurality of fields and validating corresponding inventory based on the selected fiber technology; and
    computing the fiber rollout cost projection for each of the shortest path corresponding to the plurality of fields based on the ARPU associated with each of the plurality of users of the shortest path, the total length of the corresponding shortest path and the selected fiber technology;
  generate a fiber network using the DFN algorithm based on the shortest paths corresponding to the plurality of fields and the fiber rollout cost projection associated with the shortest paths, wherein the fiber network connects maximum number of users with minimum fiber rollout cost, wherein generating the fiber network using the DFN algorithm based on the shortest paths corresponding to the plurality of fields and the fiber rollout cost projection associated with the shortest paths comprising:

receiving the shortest paths, the fiber rollout cost projection associated with each of the shortest paths and the plurality of geocoded addresses, wherein each geocoded address is a network node and a path connecting two geocoded addresses is a network edge, forming a plurality of network nodes and a plurality of network edges;

selecting a start network node from the plurality of network nodes;

traversing each network node which is unvisited through the shortest paths starting from the start network node and a plurality of child network nodes associated with each network node until a plurality of network parameters are satisfied, wherein the traversed network nodes are marked as traversed, and wherein the plurality of network parameters comprising at least one of, reaching a network node with zero child, reaching a destination network node connecting a predefined number of users and the fiber rollout cost projection between the start network node and the destination network node is above a predetermined cost threshold; and removing closed paths to obtain the fiber network, wherein the closed paths reaches the start network node forming a loop;

generate a field survey report based on the generated fiber network and a plurality of survey parameters, wherein the field survey report comprises duct validation report, new infrastructure identification, survey photographs, equipment location finalization, wherein the plurality of survey parameters includes a field survey input report, an asset demarcation, survey plan SLD (Single Line Diagram) and a resource plan, wherein the SLD provides a design of a new network rollout which comprises splicing details of the equipment planned for the user segment and automatically beautifying a construction drawing file and generating a pdf layout of a fiber network construction plan, wherein artefacts of a particular site are uploaded in a system and a final e-mail is triggered to one or more stakeholders for construction of a fiber network for a particular site;

automatically assign a plurality of field tasks upon approval of the design, and an automatic e-mail is triggered to a stakeholder when the plurality of field tasks are assigned;

auto-verify by the one or more hardware processors, one or more field jobs submitted by a field engineer and generating a report on a daily basis;

execute an application to be executed on any browser wherein a installation is not required for end users and generating an invoice automatically when the one or more field jobs are completed;

compute a fiber network construction design by updating the fiber network based on the field survey report by utilizing a design tool, wherein the design tool is AutoCAD (Computer Aided Design);

perform a fiber network rollout based on the fiber network construction design and a plurality of network rollout parameters, wherein the fiber network rollout comprises program governance, redline deviation markup, inventory monitoring and digital reporting, wherein the redline deviation markup provides a deviation in the design, wherein the splicing detail of the equipment includes connectivity of the fiber network at strand level and wherein the inventory monitoring includes monitoring whether characteristics of objects and assets required for the fiber network construction are available for the detailed design;

update in real-time the fiber network rollout based on redline deviation markup, a construction plan associated with the user segment, and the inventory, and automatically allocate a field engineer upon acceptance of the design for construction.

5. The system of claim 4, wherein the fiber technology selection selects one of a FTTN (Fiber To The Node), a FTTH (Fiber To The Home), a FTTB (Fiber To The Building), a Copper, and a HFC (Hybrid Fiber-Coaxial).

6. The system of claim 4, wherein the network rollout parameters comprises a construction plan, Bill of Material (BOM), Bill of Quantity (BoQ), permission plan, splicing characteristics with materials.

7. One or more non-transitory machine readable information storage mediums comprising one or more instructions which when executed by one or more hardware processors causes:

receiving a plurality of geocoded addresses associated with a plurality of users of a user segment to be connected by a fiber network and an Average Revenue Per User (ARPU), wherein the plurality of geocoded addresses, comprising corresponding latitude and longitude coordinates, are computed based on a plurality of survey images, and wherein the user segment is divided into a plurality of fields comprising:

a green field representing construction of new infrastructure and associated fiber infrastructure, wherein the green field is associated with a green field data comprising characteristics of, existing assets, existing roads, existing heritage and existing railway lines;

a brown field representing one or more existing infrastructure and needs alteration in existing fiber infrastructure, wherein the brown field is associated with a brown field data comprising characteristics of existing ducts, existing routes, existing cables, existing equipment, existing manholes and the green field data; and an overbuild field representing additional fiber infrastructure, wherein the overbuild is associated with an overbuild field data comprising characteristics of existing ducts, existing routes, existing equipment, existing cables, existing manholes, amount of used fiber and amount of unused fiber;

computing a fiber rollout cost projection associated with the user segment based on the ARPU, the green field data, the brown field data and the overbuild data, wherein computing the fiber rollout cost projection comprises:

computing a plurality of paths in each of the plurality of fields using a Distributed Fiber Network (DFN) algorithm, wherein computing the plurality of paths in each of the plurality of fields by the DFN algorithm comprising:

receiving the green field data, the brown field data and the overbuild data associated with the user segment, wherein each manhole associated with each of the plurality of fields is a node and a path connecting two manholes is an edge, forming a plurality of nodes and a plurality of edges;

selecting a start node from the plurality of nodes;

traversing each of the plurality of nodes which are unvisited, starting from the start node and a plurality of child nodes associated with each of the plurality of nodes until a plurality of parameters are satisfied, wherein the traversed nodes are marked as visited, and wherein the plurality of parameters comprising at least one of, reaching a node with zero child, reaching a destination node and distance between the start node and the destination node is above a predetermined distance threshold; and removing closed paths to obtain the plurality of paths, wherein the closed paths reach the start node forming a loop;

performing computation of a) an existing duct capacity for each of the plurality of paths corresponding to the brown field and the overbuild field and b) computation of a number of new brown field ducts needed, if the existing duct capacity associated with the brown field and overbuild field exceeds a predetermined duct threshold;

simultaneously computing a number of new green field ducts needed for each of the plurality of paths corresponding to the green field;

computing a shortest path from the plurality of paths corresponding to each of the plurality of fields based on a total length of a path;

performing selection of a fiber technology suitable for the shortest path corresponding to each of the plurality of fields and validating corresponding inventory based on the selected fiber technology; and computing the fiber rollout cost projection for each of the shortest path corresponding to the plurality of fields based on the ARPU associated with each of the plurality of users of the shortest path, the total length of the corresponding shortest path and the selected fiber technology;

generating a fiber network using the DFN algorithm based on the shortest paths corresponding to the plurality of fields and the fiber rollout cost projection associated with the shortest paths, wherein the fiber network connects maximum number of users with minimum fiber rollout cost, wherein generating the fiber network using the DFN algorithm based on the shortest paths corresponding to the plurality of fields and the fiber rollout cost projection associated with the shortest paths comprising:

receiving the shortest paths, the fiber rollout cost projection associated with each of the shortest paths and the plurality of geocoded addresses, wherein each geocoded address is a network node and a path connecting two geocoded addresses is a network edge, forming a plurality of network nodes and a plurality of network edges;

selecting a start network node from the plurality of network nodes;

traversing each network node which is unvisited through the shortest paths starting from the start network node and a plurality of child network nodes associated with each network node until a plurality of network parameters are satisfied, wherein the traversed network nodes are marked as traversed, and wherein the plurality of network parameters comprising at least one of, reaching a network node with zero child, reaching a destination network node connecting a predefined number of users and the fiber rollout cost projection between the start network node and the destination network node is above a predetermined cost threshold; and removing closed paths to obtain the fiber network, wherein the closed paths reaches the start network node forming a loop;

generating a field survey report based on the generated fiber network and a plurality of survey parameters, wherein the field survey report comprises duct validation report, new infrastructure identification, survey photographs, equipment location finalization, wherein the plurality of survey parameters includes a field survey input report, an asset demarcation, survey plan SLD (Single Line Diagram) and a resource plan, wherein the SLD provides a design of a new network rollout which comprises splicing details of the equipment planned for the user segment and automatically beautifying a construction drawing file and generating a pdf layout of a fiber network construction plan, wherein artefacts of a particular site are uploaded in a system and a final e-mail is triggered to one or more stakeholders for construction of a fiber network for a particular site;

automatically assigning a plurality of field tasks upon approval of the design, and an automatic e-mail is triggered to a stakeholder when the plurality of field tasks are assigned;

auto-verifying one or more field jobs submitted by a field engineer and generating a report on a daily basis;

executing an application to be executed on any browser wherein a installation is not required for end users and generating an invoice automatically when the one or more field jobs are completed;

computing a fiber network construction design by updating the fiber network based on the field survey report by utilizing a design tool, wherein the design tool is AutoCAD (Computer Aided Design);

performing a fiber network rollout based on the fiber network construction design and a plurality of network rollout parameters, wherein the fiber network rollout comprises program governance, redline deviation markup, inventory monitoring and digital reporting; and updating the fiber network rollout based on redline deviation markup, a construction plan associated with the user segment, and the inventory.

\* \* \* \* \*